United States Patent
Li et al.

(10) Patent No.: US 7,986,114 B1
(45) Date of Patent: Jul. 26, 2011

(54) FAST STARTUP SUPPLY FOR CHIP INITIALIZATION

(75) Inventors: Ying Tian Li, Singapore (SG); Vishnu Kumar, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/827,517

(22) Filed: Jun. 30, 2010

Related U.S. Application Data

(63) Continuation of application No. 11/893,544, filed on Aug. 16, 2007, now Pat. No. 7,750,584.

(60) Provisional application No. 60/823,179, filed on Aug. 22, 2006.

(51) Int. Cl.
*H02P 1/54* (2006.01)
(52) U.S. Cl. .......... 318/108; 318/106; 318/107; 318/109
(58) Field of Classification Search .................. 318/108, 318/107, 106, 109
See application file for complete search history.

(56) References Cited

U.S. PATENT DOCUMENTS

| 4,682,168 | A |  | 7/1987 | Chang et al. |  |
| 4,845,619 | A |  | 7/1989 | Steely et al. |  |
| 5,467,039 | A |  | 11/1995 | Bae |  |
| 5,752,047 | A | * | 5/1998 | Darty et al. | 713/300 |
| 6,778,349 | B2 |  | 8/2004 | Ricotti et al. |  |
| 7,110,314 | B2 | * | 9/2006 | Murakuki et al. | 365/226 |
| 7,382,675 | B2 | * | 6/2008 | Kanda | 365/226 |

* cited by examiner

*Primary Examiner* — Bentsu Ro
*Assistant Examiner* — David S Luo

(57) ABSTRACT

A motor driver comprises a first power supply, a second power supply, a multiplexer, and an output power module. The first power supply provides a first power signal after a first period. The second power supply provides a second power signal after a second period, where the second period is longer than the first period. The multiplexer initially selects the first power signal and then selects the second power signal. An output power module controls a motor and receives power from an output of the multiplexer.

20 Claims, 12 Drawing Sheets

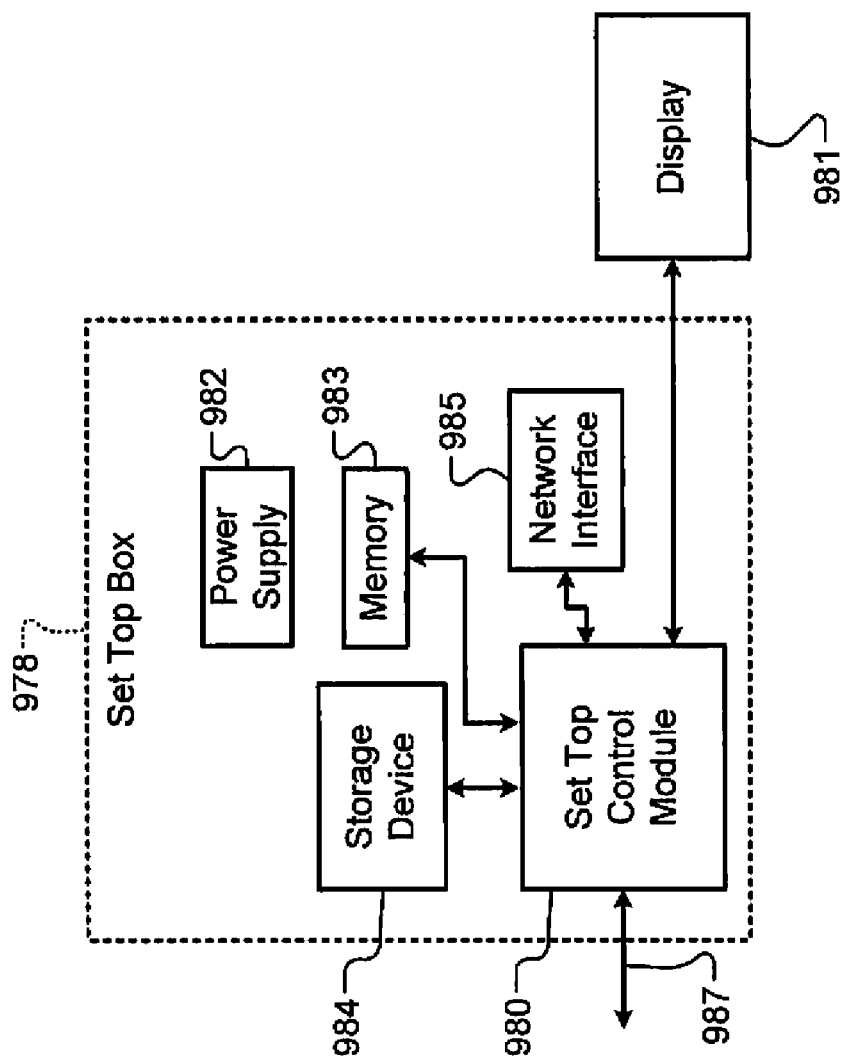

FAST STARTUP SUPPLY FOR CHIP INITIALIZATION

CROSS-REFERENCE TO RELATED APPLICATIONS

This application is a continuation of U.S. patent application Ser. No. 11/893,544, filed Aug. 16, 2007, which claims the benefit of U.S. Provisional Application No. 60/823,179, filed Aug. 22, 2006. The disclosures of the above applications are incorporated herein by reference in their entirety.

FIELD

The present disclosure relates to fast startup power supplies for providing power during chip initialization.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an exemplary motor driver 100 according to the prior art is presented. The motor driver 100 includes a power supply 102, such as a 12 Volt (V) power supply, and a linear regulator 104, such as a 5 Volt (5V) linear regulator. The power supply 102 receives an input signal, VIN, such as a 12V signal. The power supply 102 provides an output signal, VPWR, at approximately 12V to the linear regulator 104, other circuitry 106 that may operate at 12V, and output power transistors 108.

The power supply 102 may include a voltage reference 118, such as a bandgap reference circuit or a reference circuit based upon diode voltage drops, to create an accurate output, for example at 12V. In various implementations, the input signal, VIN, and the output signal, VPWR, are smaller or larger than 12V. The linear regulator 104 produces a stable power signal, VDD5_REG, which may be at approximately 5V.

The linear regulator 104 communicates with a capacitor 110, which may be external to the motor driver 100. The capacitor 110 provides loop stability and ripple filtration for the linear regulator 104. The VDD5_REG signal is received by the output power transistors 108 and by other circuitry 112 that may operate at 5V. The output power transistors 108 control current through a motor 114, which may be external to the motor driver 100. The linear regulator 104 may include a bandgap reference 116 to provide a reasonably accurate voltage that is temperature independent.

SUMMARY

A motor driver comprises a first power supply, a second power supply, a multiplexer, and an output power module. The first power supply provides a first power signal after a first period. The second power supply provides a second power signal after a second period, where the second period is longer than the first period. The multiplexer initially selects the first power signal and then selects the second power signal. An output power module controls a motor and receives power from an output of the multiplexer.

In other features, the motor driver further comprises an initialization module that establishes a bias state of the output power module and receives power from the output of the multiplexer. The output power module includes a metal-oxide semiconductor field effect transistor (MOSFET) that includes a gate, a source, and a drain. The MOSFET has voltages including a gate-source breakdown voltage, a gate-drain breakdown voltage, and a drain-source breakdown voltage, and wherein one of the voltages is less than others of the voltages.

In further features, the gate-source breakdown voltage is less than the gate-drain breakdown voltage and the drain-source breakdown voltage. The motor driver further comprises a supply analysis module that generates a ready signal. The multiplexer selects the second power signal when the ready signal is received. The supply analysis module generates the ready signal when a voltage of the second power signal is greater than a first predetermined voltage for a first predetermined period.

In still other features, the motor driver further comprises a third power supply that provides a third power signal to the first and second power supplies. The supply analysis module generates the ready signal when a voltage of the second power signal is greater than a first predetermined voltage for a first predetermined period and a voltage of the third power signal is greater than a second predetermined voltage for a second predetermined period.

In other features, the motor driver further comprises a third power supply that provides a third power signal to the first and second power supplies. The first power supply provides a reference voltage to the third power supply. The first power supply comprises a bandgap reference generator that produces a reference voltage and a reference current; and a voltage generator that produces the first power signal based upon the reference voltage and the reference current.

In further features, the multiplexer comprises an inverter that includes two terminals. The two terminals include an input and an output; a first transistor that includes first and second terminals that communicate with the output of the multiplexer and with the first power signal, respectively, A control terminal of the first transistor communicates with one of the two terminals of the inverter; and a second transistor that includes first and second terminals that communicate with the output of the multiplexer and with the second power signal, respectively, A control terminal of the second transistor communicates with another one of the two terminals of the inverter.

In still other features, the multiplexer further comprises a third transistor that includes a first terminal that communicates with the input of the inverter and a control terminal that receives a ready signal; a first current mirror that provides a first current proportional to a reference current received from the first power supply; and a second current mirror that provides a second current proportional to the first current. The third transistor is biased by the second current. The first power signal is more accurate than the second power signal. The multiplexer selects the second power signal after the second period. A hard disk drive (HDD) comprises the motor driver of claim 1. A digital versatile disc (DVD) drive comprises the motor driver of claim 1.

A method comprises providing a first power signal after a first period; providing a second power signal after a second period, where the second period is longer than the first period; initially selecting the first power signal; selecting the second power signal; and controlling a motor with power from the selected power signal.

In other features, the method further comprises establishing a bias state of an output power module by using power from the selected power signal. The method further comprises providing a metal-oxide semiconductor field effect transistor (MOSFET) that includes a gate, a source, and a drain. The MOSFET has voltages including a gate-source breakdown voltage, a gate-drain breakdown voltage, and a drain-source breakdown voltage, and wherein one of the voltages is less than others of the voltages.

In further features, the gate-source breakdown voltage is less than the gate-drain breakdown voltage and the drain-source breakdown voltage. The method further comprises generating a ready signal; and selecting the second power signal based upon the ready signal. The method further comprises generating the ready signal when a voltage of the second power signal is greater than a first predetermined voltage for a first predetermined period.

In still other features, the method further comprises generating the ready signal when a voltage of the second power signal is greater than a first predetermined voltage for a first predetermined period and a voltage of a third power signal is greater than a second predetermined voltage for a second predetermined period. The method further comprises producing the first power signal based upon a bandgap voltage. The first power signal is more accurate than the second power signal. The method further comprises selecting the second power signal after the second period.

A motor driver comprises first power supply means for providing a first power signal after a first period; second power supply means for providing a second power signal after a second period, where the second period is longer than the first period; multiplexing means for initially selecting the first power signal and then selecting the second power signal; and output means for controlling a motor and that receives power from an output of the multiplexing means.

In other features, the motor driver further comprises initialization means for establishing a bias state of the output means and that receives power from the output of the multiplexing means. The output means includes a metal-oxide semiconductor field effect transistor (MOSFET) that includes a gate, a source, and a drain. The MOSFET has voltages including a gate-source breakdown voltage, a gate-drain breakdown voltage, and a drain-source breakdown voltage, and wherein one of the voltages is less than others of the voltages.

In further features, the gate-source breakdown voltage is less than the gate-drain breakdown voltage and the drain-source breakdown voltage. The motor driver further comprises supply analysis means for generating a ready signal. The multiplexing means selects the second power signal when the ready signal is received. The supply analysis means generates the ready signal when a voltage of the second power signal is greater than a first predetermined voltage for a first predetermined period.

In still other features, the motor driver further comprises third power supply means for providing a third power signal to the first and second power supply means. The supply analysis means generates the ready signal when a voltage of the second power signal is greater than a first predetermined voltage for a first predetermined period and a voltage of the third power signal is greater than a second predetermined voltage for a second predetermined period.

In other features, the motor driver further comprises third power supply means for providing a third power signal to the first and second power supplies. The first power supply means provides a reference voltage to the third power supply means. The first power supply means comprises bandgap reference means for producing a reference voltage and a reference current; and voltage generating means for producing the first power signal based upon the reference voltage and the reference current.

In further features, the multiplexing means comprises inverting means for inverting a signal and that includes two terminals. The two terminals include an input and an output; first switching means for connecting first and second terminals based upon a control terminal. The first and second terminals communicate with the output of the multiplexing means and with the first power signal, respectively. The control terminal of the first switching means communicates with one of the two terminals of the inverting means; and a second switching means for connecting first and second terminals based upon a control terminal. The first and second terminals communicate with the output of the multiplexing means and with the second power signal, respectively. The control terminal of the second switching means communicates with another one of the two terminals of the inverting means.

In still other features, the multiplexing means further comprises third switching means for amplifying a control signal and that includes a first terminal that communicates with the input of the inverting means and a control terminal that receives a ready signal; first current mirroring means for providing a first current proportional to a reference current received from the first power supply means; and second current mirroring means for providing a second current proportional to the first current. The third switching means is biased by the second current. The first power signal is more accurate than the second power signal. The multiplexing means selects the second power signal after the second period. A hard disk drive (HDD) comprises the motor driver of claim 1. A digital versatile disc (DVD) drive comprises the motor driver of claim 1.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9E is a functional block diagram of a set top box.

DETAILED DESCRIPTION

Figure 1:
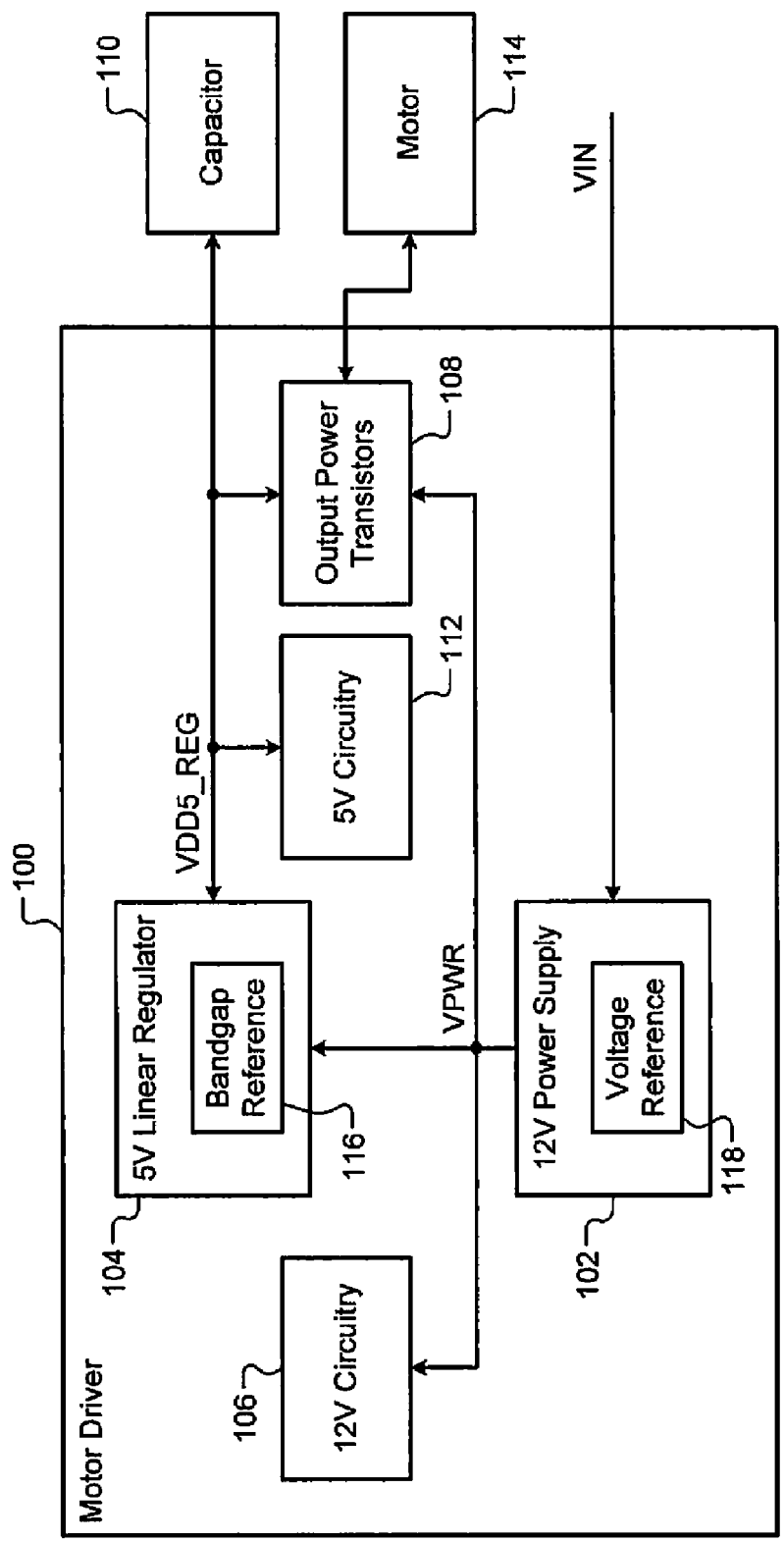
FIG. 1 is a functional block diagram of an exemplary motor driver according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
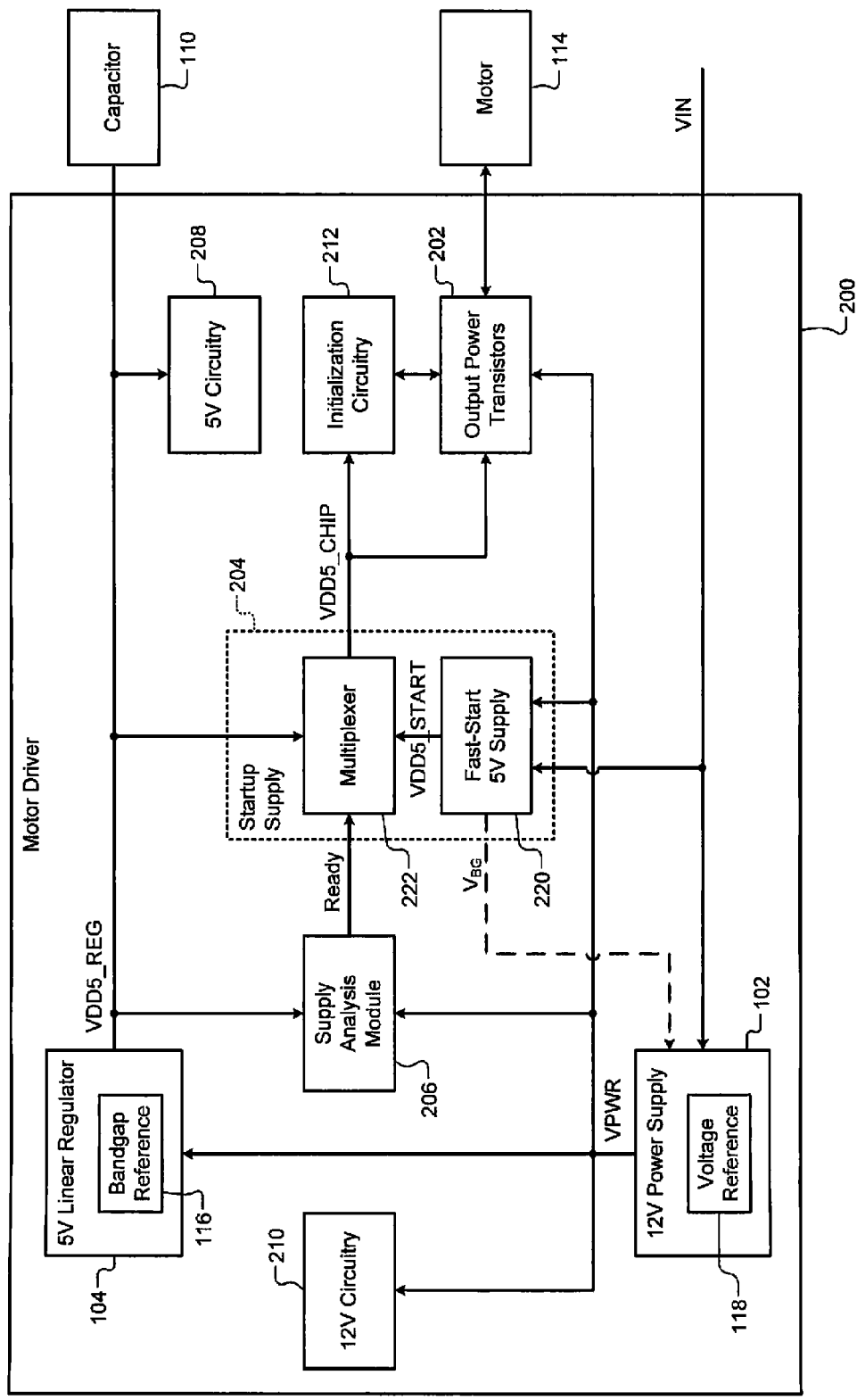
FIG. 2 is a functional block diagram of an exemplary motor driver according to the principles of the present disclosure.

Referring now to FIG. 2, a functional block diagram of an exemplary motor driver 200 according to the principles of the present disclosure is presented. The motor driver 200 includes the power supply 102, the linear regulator 104, output power transistors 202, and a startup supply 204.

The linear regulator 104 communicates with the capacitor 110 and the output power transistors 202 communicate with the motor 114. The linear regulator 104 may provide a regulated 5V output, VDD5_REG, to the startup supply 204, a supply analysis module 206, and other circuitry 208 that may operate at 5V. The power supply 102 receives an input power signal, VIN, from a source such as a personal computer power supply.

In various implementations, the power supply 102 filters out noise present on the VIN signal and protects against overvoltage conditions on the VIN signal. The power supply 102 provides an output signal, VPWR, to the supply analysis module 206, the startup supply 204, the output power transistors 202, and other circuitry 210. The VPWR signal may be approximately 12V. The output power transistors 202 require a large amount of area in an integrated circuit because of their current and voltage requirements. For example only, the output power transistors 202 may include NMOS and/or PMOS power transistors.

In order to reduce the size of the output power transistors 202, and thereby decrease the layout footprint of the motor driver 200, breakdown voltage performance of the output power transistors 202 may be sacrificed. For instance, gate-to-drain and drain-to-source breakdown voltages may both exceed 18V, while the gate-to-source breakdown voltage is limited to a reduced value, such as approximately 5V.

This reduced gate-to-source breakdown voltage allows for a significant reduction in area of the output power transistors 202. However, initialization circuitry 212 is necessary to ensure that the output power transistors 202 are properly biased to prevent the gate-to-source voltage from exceeding the reduced value.

If the initialization circuitry 212 is not powered when the output power transistors 202 receive VPWR, the output power transistors 202 may not be properly biased. In such a case, a breakdown voltage of the output power transistors 202 may be exceeded. In addition, improper bias of the output power transistors 202 may cause a large inrush current from the VPWR signal and may even cause the output power transistors 202 to source a short-circuit current from the VPWR signal.

The capacitance value of the capacitor 110 is fairly large to provide adequate filtering and stability to the linear regulator 104. The VDD5_REG signal is delayed in reaching its steady state value (such as 5V) while the capacitor 110 is being charged. While the VDD5_REG signal is building, power is temporarily provided to the initialization circuitry 212 by the startup supply 204.

The startup supply 204 can achieve faster startup by sacrificing the accuracy and temperature stability of the linear regulator 104. Once the VDD5_REG signal reaches the steady state value, the initialization circuitry 212 and the output power transistors 202 can switch over to being powered by the VDD5_REG signal. In this way, fast startup performance gives way to sustained accuracy and stability.

The startup supply 204 includes a fast-start supply 220 and a multiplexer 222. The fast-start supply 220 receives the VPWR signal from the power supply 102 and provides an output voltage signal, VDD5_START, to the multiplexer 222. The VDD5_START signal may be approximately 5V. The supply analysis module 206 provides a Ready signal once the output of the linear regulator 104 is stable. In various implementations, the supply analysis module 206 waits for the output of the power supply 102 to be stable before producing the Ready signal.

The multiplexer 222 selects one of the VDD5_START and VDD5_REG signals to communicate to the initialization circuitry 212 and the output power transistors 202 as VDD5_CHIP. When the multiplexer 222 has not received the Ready signal, the multiplexer 222 selects the VDD5_START signal. Once the multiplexer 222 receives the Ready signal, the multiplexer 222 selects the VDD5_REG signal.

In various implementations, some or all components of the motor driver 200 may be included in a single integrated circuit. The fast-start supply 220 includes a voltage reference, such as a bandgap reference, as described in more detail below. A voltage or current reference signal from the voltage reference may be communicated to the power supply 102. The power supply 102 can then generate the VPWR signal based upon the reference signal, and does not need to include the voltage reference 118. The power supply 102 may alternately receive a reference signal from another source.

Figure 3:
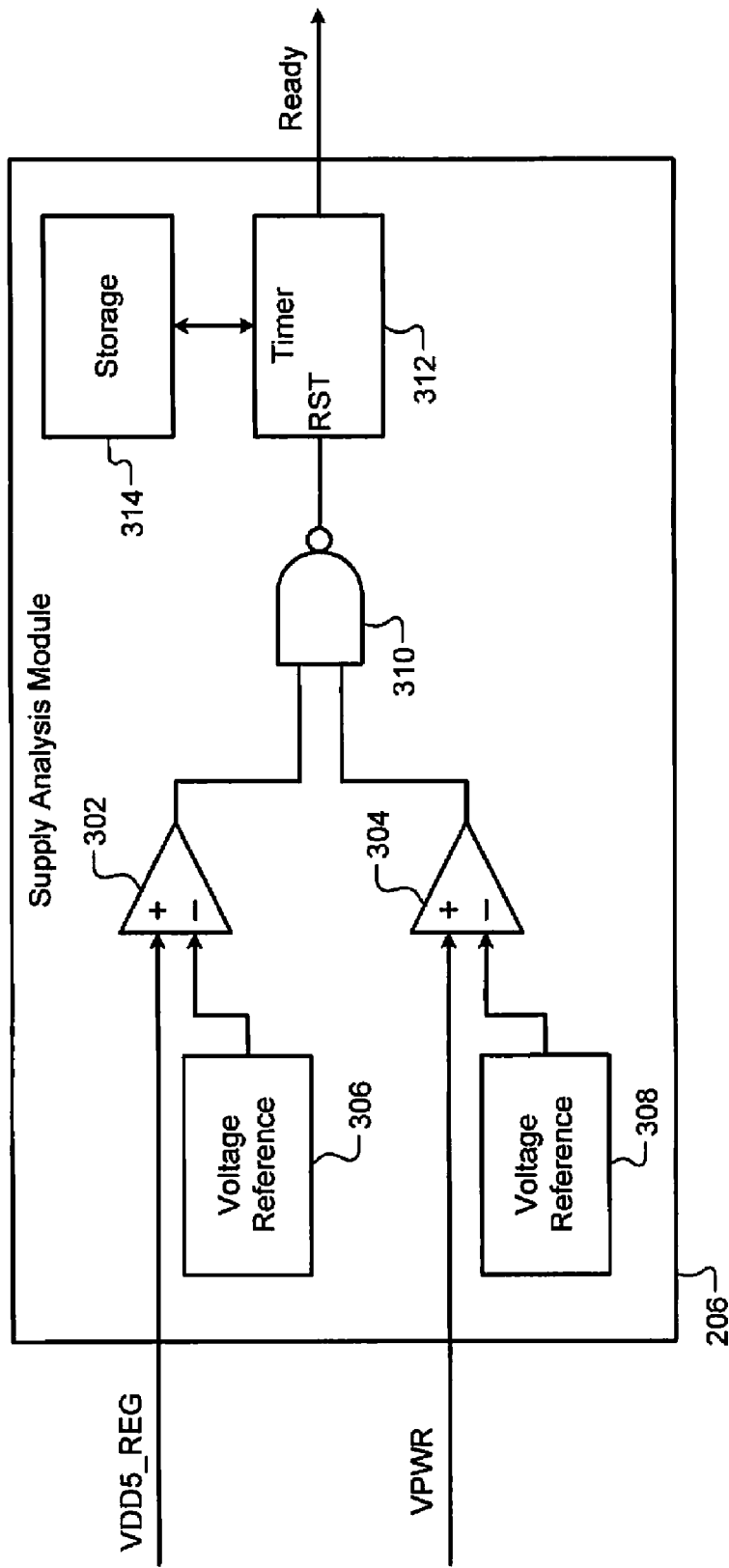
FIG. 3 is a functional block diagram of an exemplary supply analysis module according to the principles of the present disclosure.

Referring now to FIG. 3, a functional block diagram of an exemplary implementation of the supply analysis module 206 according to the principles of the present disclosure is presented. The supply analysis module 206 includes first and second comparators 302 and 304. The first and second comparators 302 and 304 compare VDD5_REG and VPWR to signals from first and second voltage references 306 and 308, respectively.

Outputs of the first and second comparators 302 and 304 are communicated to a logic gate 310, such as a NAND gate. The output of the logic gate 310 is communicated to a reset input of a timer 312. In various implementations, the first and second comparators 302 and 304 output a high signal when the VDD5_REG signal and the VPWR signal are greater than the signals supplied by the first and second voltage references 306 and 308, respectively.

The output of the logic gate 310 is high whenever either output of the first and second comparators 302 and 304 is low. A high output from the logic gate 310 causes the timer 312 to reset. Once the timer 312 has reached a predetermined value, the Ready signal is output from the supply analysis module

206. If either output of the first and second comparators 302 and 304 is low, the timer 312 is reset.

The VDD5_REG and VPWR signals may be considered stable if they have been above a certain voltage for a predetermined period of time. In this case, the Ready signal is generated once the outputs of both the first and second comparators 302 and 304 have been high continuously for the time period described by the predetermined value. The predetermined value may be located in storage 314, such as volatile and/or nonvolatile memory. The predetermined value may be placed into storage 314 during manufacturing and/or through programming.

The supply analysis module 206 may generate the Ready signal based only upon the VDD5_REG signal. In this case, the second voltage reference 308 and the second comparator 304 are not necessary. The logic gate 310 may then include a NOT gate. Further, the logic gate 310 may be omitted altogether if the timer 312 is chosen such that the reset input is active-low instead of active-high, or vice versa.

The first voltage reference 306 may be a ground reference or a voltage-divided portion of the VPWR signal. The supply analysis module 206 may be configured so that the timer 312 generates the Ready signal a predetermined period of time after the VPWR signal is received. Alternately, the timer 312 may generate the Ready signal a predetermined period of time after the VDD5_REG signal increases above a ground potential.

Figure 4:
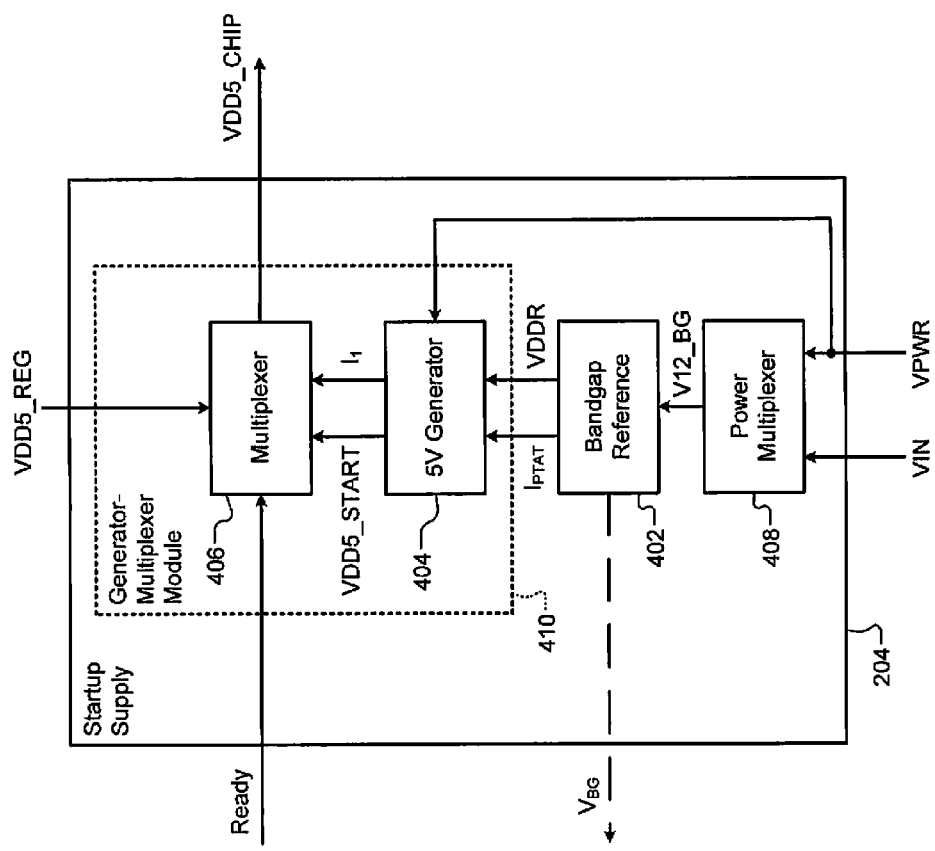
FIG. 4 is a functional block diagram of an exemplary startup supply according to the principles of the present disclosure.

Referring now to FIG. 4, a functional block diagram of an exemplary implementation of the startup supply 204 according to the principles of the present disclosure is presented. The startup supply 204 includes a bandgap reference 402, a generator 404, a multiplexer 406, and a power multiplexer 408. A generator-multiplexer module 410 includes the generator 404 and the multiplexer 406.

The generator 404 and the power multiplexer 408 receive the VPWR signal from the power supply 102. The power multiplexer 408 also receives the VIN signal. The power multiplexer 408 selects the larger of the VIN and VPWR signals and communicates the selected signal, V12_BG, to the bandgap reference 402.

The bandgap reference 402 provides a current, $I_{PTAT}$, which is proportional to absolute temperature and a voltage, VDDR, to the generator 404. The generator 404 generates a supply signal, VDD5_START, which may be a 5V signal. The VDD5_START signal is received at a first input of the multiplexer 406, and may also provide power to the multiplexer 406.

In various implementations, the generator 404 provides a current, $I_1$, to the multiplexer 406. The VDD5_REG signal is received at a second input of the multiplexer. The Ready signal selects one of the two inputs to the multiplexer 406 to be output as the power supply for the chip, VDD5_CHIP. In various implementations, the multiplexer 406 selects the VDD5_REG signal once the Ready signal is received. In various implementations, the bandgap reference 402 provides a bandgap voltage, $V_{BG}$, to the power supply 102, as described above.

Figure 5:
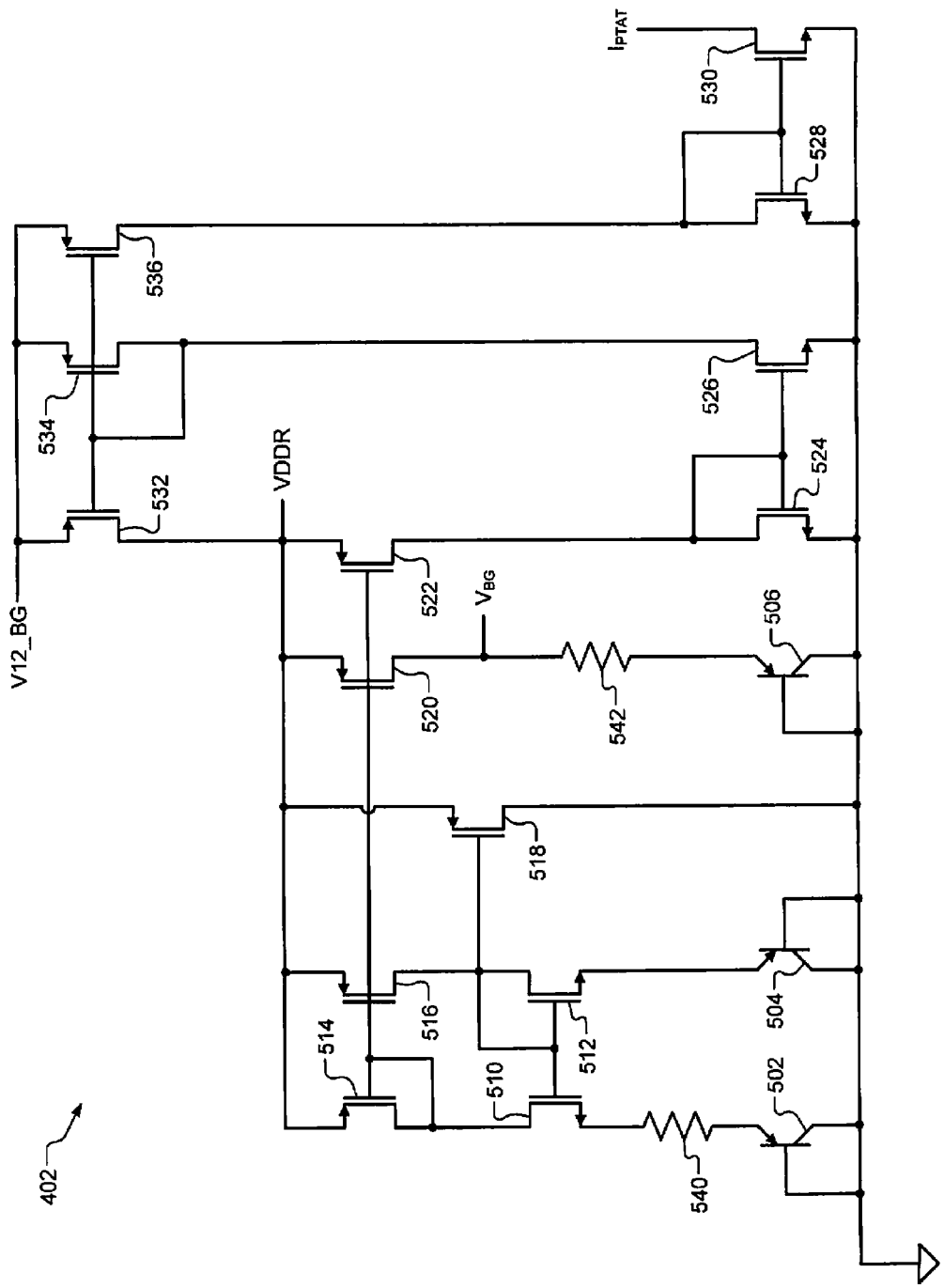
FIG. 5 is a functional schematic of an exemplary bandgap reference according to the principles of the present disclosure.

Referring now to FIG. 5, a functional schematic of an exemplary implementation of the bandgap reference 402 according to the principles of the present disclosure is presented. The bandgap reference 402 includes first, second, and third bipolar junction transistors (BJTs) 502, 504, and 506. In various implementations, the first, second, and third BJTs 502, 504, and 506 are PNP-type transistors that include bases, collectors, and emitters, although other transistor types may be used.

The bases and the collectors of the BJTs 502, 504, and 506 communicate with a ground potential. The bandgap reference 402 includes first, second, third, fourth, fifth, sixth, seventh, eighth, ninth, tenth, eleventh, twelfth, thirteenth, and fourteenth transistors 510, 512, 514, 516, 518, 520, 522, 524, 526, 528, 530, 532, 534, and 536.

In various implementations, the first, second, third, fourth, fifth, sixth, seventh, eighth, ninth, tenth, eleventh, twelfth, thirteenth, and fourteenth transistors 510, 512, 514, 516, 518, 520, 522, 524, 526, 528, 530, 532, 534, and 536 are metal oxide semiconductor field effect transistors (MOSFETs) that have gates, sources, and drains, although other transistor types may be used.

One end of a first resistance 540 communicates with the emitter of the first BJT 502. An opposite end of the first resistance 540 communicates with the source of the first transistor 510. The emitter of the second BJT 504 communicates with the source of the second transistor 512. The gates of the first and second transistors 510 and 512 communicate with the drain of the second transistor 512.

The gates of the third and fourth transistors 514 and 516 communicate with the drain of the third transistor 514. The drains of the first and second transistors 510 and 512 communicate with the drains of the third and fourth transistors 514 and 516, respectively. The gate of the fifth transistor 518 communicates with the drain of the second transistor 512.

The drain of the fifth transistor 518 communicates with the ground potential. The source of the fifth transistor 518 communicates with the sources of the third and fourth transistors 514 and 516 at a node labeled VDDR. A first end of a second resistance 542 communicates with the emitter of the third BJT 506. An opposite end of the second resistance 542 communicates with the drain of the sixth transistor 520 at a node labeled $V_{BG}$.

The gate and the source of the sixth transistor 520 communicate with the gate and the source of the fourth transistor 516, respectively. In various implementations, the $V_{BG}$ signal is not produced and the third BJT 506, the second resistance 542, and the sixth transistor 520 are omitted from the bandgap reference 402.

The gate and the source of the seventh transistor 522 communicate with the gate and the source of the fourth transistor 516, respectively. The drain of the seventh transistor 522 communicates with the gates of the eighth and ninth transistors 524 and 526 and with the drain of the eighth transistor 524.

The sources of the eighth, ninth, tenth, and eleventh transistors, 524, 526, 528, and 530 communicate with the ground potential. The gates of the tenth and eleventh transistors 528 and 530 communicate with the drains of the tenth and fourteenth transistors 528 and 536. The current traveling through the eleventh transistor 530 is labeled $I_{PTAT}$ and is outputted from the drain of the eleventh transistor 530.

The drain of the ninth transistor 526 communicates with the gates of the twelfth and thirteenth transistors 532 and 534 and with the drain of the thirteenth transistor 534. The gate of the fourteenth transistor 536 communicates with the gate of the twelfth transistor 532. The drain of the twelfth transistor 532 communicates with the VDDR node.

The sources of the twelfth, thirteenth, and fourteenth transistors 532, 534, and 536 communicate with each other at a node labeled V12_BG. The V12_BG node receives the V12_BG signal from the power multiplexer 408. The voltage at the VDDR node is a bandgap voltage, which is outputted to the generator 404. The voltage at VDDR is defined by $V_{EB}$ (emitter-base voltage) of the second BJT 504 plus $V_{GS}$ (gate-source voltage) of the second transistor 512 plus $V_{SG}$ (source-gate voltage) of the fifth transistor 518.

In various implementations, the first, second, third, fourth, fifth, sixth, seventh, eighth, ninth, tenth, eleventh, twelfth, thirteenth, and fourteenth transistors 510, 512, 514, 516, 518, 520, 522, 524, 526, 528, 530, 532, 534, and 536 have bulk terminals that are tied to their respective source terminals. In various implementations, the first, second, eighth, ninth, tenth, and eleventh transistors 510, 512, 524, 526, 528, and 530 are n-channel MOSFETs. In various implementations, the third, fourth, fifth, sixth, seventh, twelfth, thirteenth, and fourteenth transistors 514, 516, 518, 520, 522, 532, 534, and 536 are p-channel MOSFETs.

Figure 6:
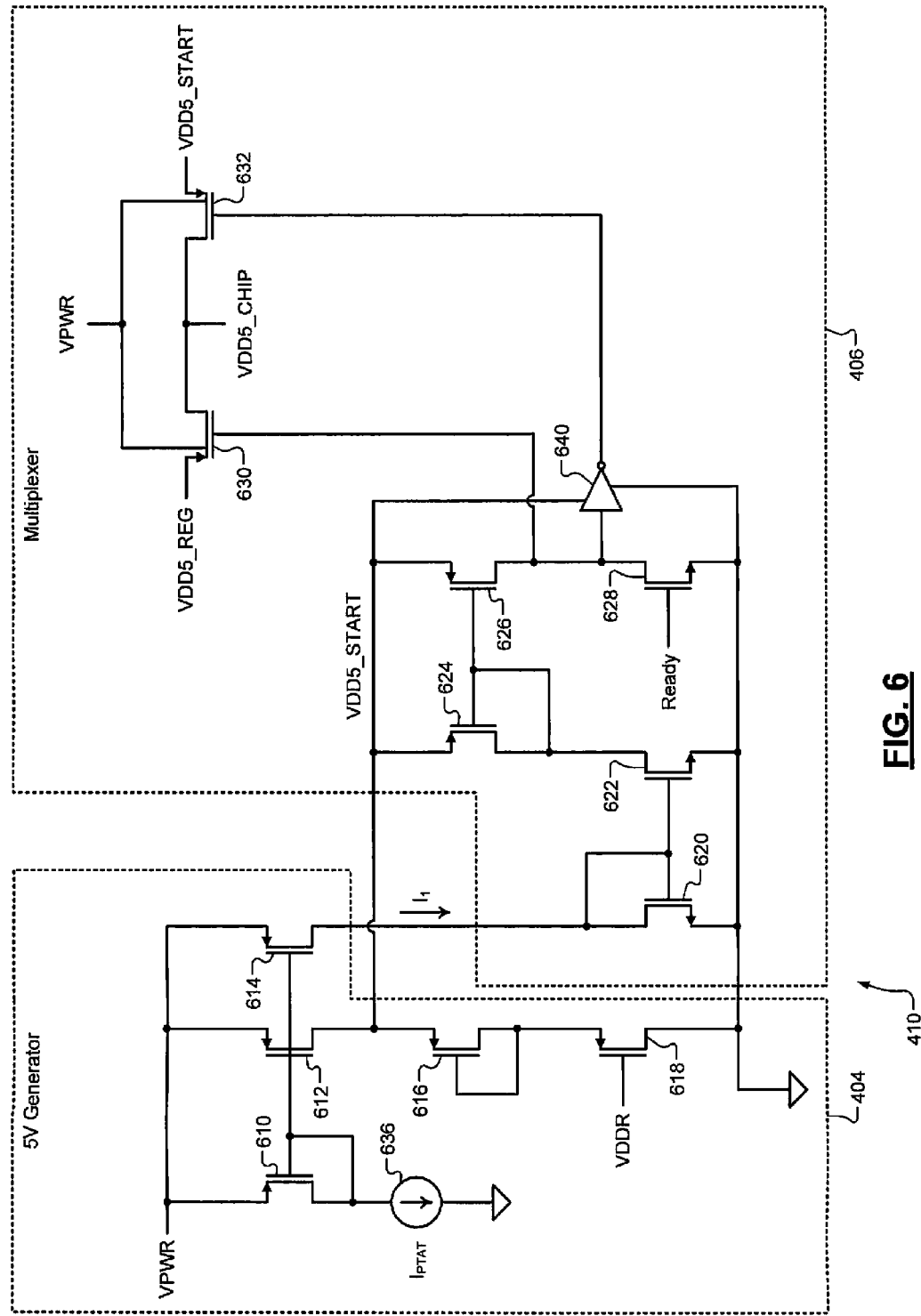
FIG. 6 is a functional schematic diagram of an exemplary generator-multiplexer module according to the principles of the present disclosure.

Referring now to FIG. 6, a functional schematic diagram of an exemplary implementation of the generator-multiplexer module 410 according to the principles of the present disclosure is presented. The generator-multiplexer module 410 includes the generator 404 and the multiplexer 406. The generator-multiplexer module 410 includes first, second, third, fourth, fifth, sixth, seventh, eighth, ninth, tenth, eleventh, and twelfth transistors 610, 612, 614, 616, 618, 620, 622, 624, 626, 628, 630, and 632.

In various implementations, the first, second, third, fourth, fifth, sixth, seventh, eighth, ninth, tenth, eleventh, and twelfth transistors 610, 612, 614, 616, 618, 620, 622, 624, 626, 628, 630, and 632 are metal oxide semiconductor field effect transistors (MOSFETs) that have gates, sources, and drains, although other transistor types may be used. A current source 636, such as the eleventh transistor 530 of the bandgap reference 402, provides a current, $I_{PTAT}$, to the drain of the first transistor 610.

The drain of the first transistor 610 communicates with the gates of the first, second, and third transistors 610, 612, and 614. The sources of the first, second, and third transistors 610, 612, and 614 communicate with each other at a node labeled VPWR. The VPWR node receives the VPWR signal from the power supply 102. The drain of the second transistor 612 communicates with the source of the fourth transistor 616 at a node labeled VDD5_START.

The gate and the drain of the fourth transistor 616 communicate with the source of the fifth transistor 618. The gate of the fifth transistor 618 receives the VDDR signal from the bandgap reference 402. The drain of the fifth transistor 618 communicates with a ground potential. The sources of the sixth, seventh, and tenth transistors 620, 622, and 628 communicate with the ground potential.

The gates of the sixth and seventh transistors 620 and 622 communicate with the drain of the sixth transistor 620. The drain of the sixth transistor 620 receives a current, $I_1$, which may be supplied from the drain of the third transistor 614. The drain of the seventh transistor 622 communicates with the drain of the eighth transistor 624 and with the gates of the eighth and ninth transistors 624 and 626.

The sources of the eighth and ninth transistors 624 and 626 communicate with each other at a node labeled VDD5_START, which may be supplied from the VDD5_START node at the drains of the second and fourth transistors 612 and 616. An inverter 640 is powered from the ground potential and the VDD5_START node.

The drains of the ninth and tenth transistors 626 and 628 communicate with the gate of the eleventh transistor 630. The gate of the tenth transistor 628 receives the Ready signal, such as from the supply analysis module 206 of FIGS. 2 and 3. An output of the inverter 640 is communicated to the gate of the twelfth transistor 632. In various implementations, the eleventh and twelfth transistors 630 and 632 are operated as pass transistors.

The drains of the eleventh and twelfth transistors 630 and 632 communicate with each other at a node labeled VDD5_CHIP, which provides power to components such as the initialization circuitry 212 and the output power transistors 202 of FIG. 2A. In various implementations, the eleventh and twelfth transistors 630 and 632 include bulk terminals that communicate with the VPWR signal from the power supply 102.

In various implementations, the first, second, third, fourth, fifth, sixth, seventh, eighth, ninth, and tenth transistors 610, 612, 614, 616, 618, 620, 622, 624, 626, and 628 include bulk terminals that are tied to their respective sources. The source of the eleventh transistor 630 communicates with the regulated voltage supply signal, VDD5_REG. The source of the twelfth transistor 632 communicates with a power supply signal VDD5_START, such as that supplied by the generator 404.

The VDD5_START node is defined by the voltage VDDR plus $V_{SG}$ of the fifth transistor 618 plus $V_{SG}$ of the fourth transistor 616. The current through the fourth and fifth transistors 616 and 618, and thus the gate-source voltages, is defined by the current source 636, thereby producing a well-defined voltage reference voltage, VDD5_START, across temperature and process variations. In various implementations, the VDD5_START voltage may be within the range of 4.8V to 6.0V for a given range of temperature and process variations.

The multiplexer 406 selects one of the power supply inputs, VDD5_REG and VDD5_START to output as VDD5_CHIP. When the Ready signal is high, the input of the inverter 640 is low, the eleventh transistor 630 is turned off, and the twelfth transistor 632 is turned on. When the Ready signal is low, the input of the inverter 640 is high, and the eleventh transistor 630 is turned on and the twelfth transistor 632 is turned off. In this way, before the Ready signal goes high, the VDD5_START signal is selected. Once the Ready signal goes high, the VDD5_REG signal is selected. Simple modifications will allow the multiplexer 406 to receive an active-low Ready signal instead of an active-high Ready signal.

Figure 7:
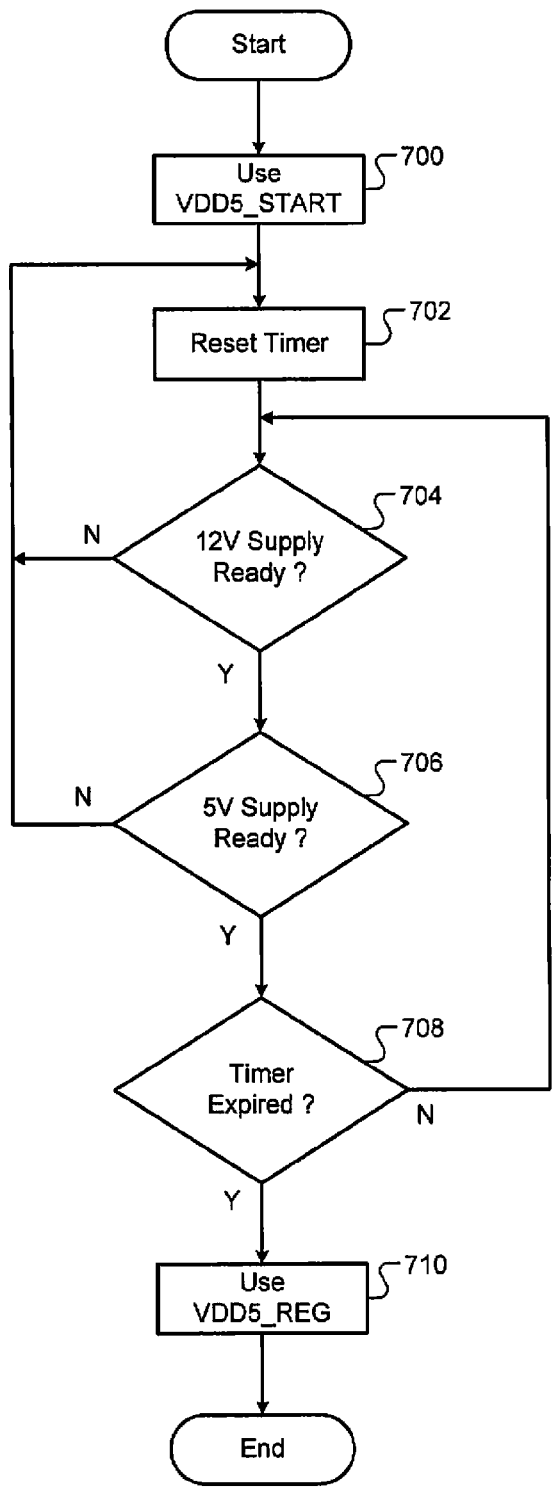
FIG. 7 is a flow chart depicting exemplary operation of a motor driver according to the principles of the present disclosure.

Referring now to FIG. 7, a flow chart depicts exemplary operation of the motor driver 200 according to the principles of the present disclosure. Control begins in step 700, where power from the VDD5_START signal is used for the output power transistors 202 and the initialization circuitry 212. Control continues in step 702, where a timer is reset. Control continues in step 704, where control determines whether the power supply 102 is ready. If so, control continues in step 706; otherwise, control returns to step 702.

In step 706, control determines whether the linear regulator 104 is ready. If so, control continues in step 708; otherwise, control returns to step 702. In various implementations, readiness of the power supply 102 and/or the linear regulator 104 is determined based upon whether their voltages are above predetermined values. In various implementations, readiness of the power supply 102 and/or the linear regulator 104 also includes whether their voltages are below other predetermined values.

In step 708, control determines whether the timer has expired. If so, control continues in step 710; otherwise, control returns to step 704. In step 710, the VDD5_REG power supply signal from the linear regulator 104 is used. Control then ends. In various implementations, the linear regulator 104 comprises any other suitable type of voltage regulator, such as a switching-mode voltage regulator.

Figure 8:
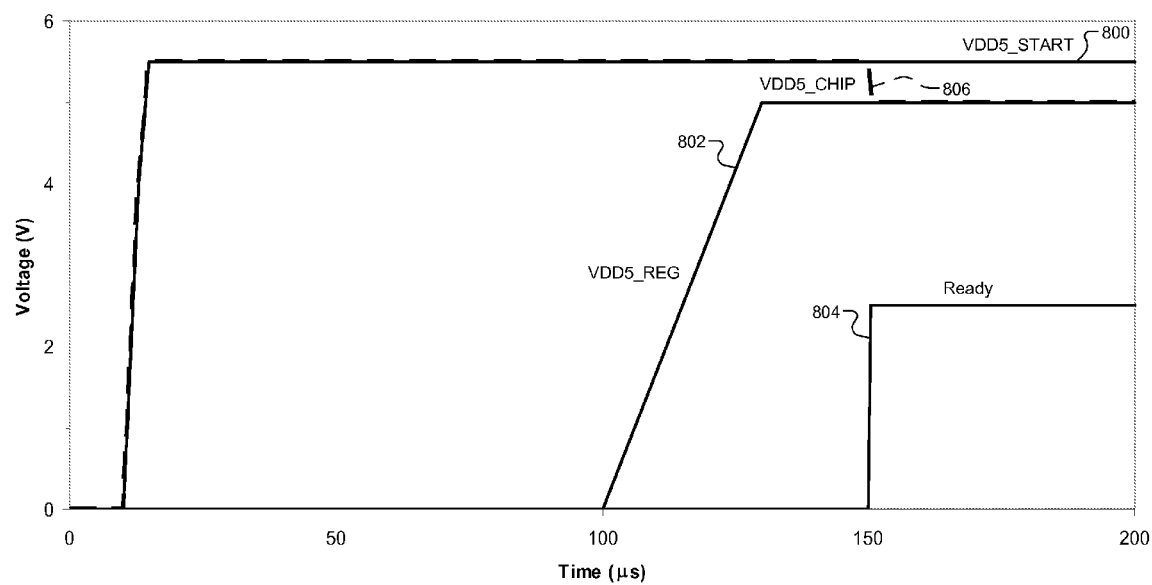
FIG. 8 is a graphical representation of power supply voltages according to the principles of the present disclosure.

Referring now to FIG. 8, a graphical representation of power supply voltages according to the principles of the present disclosure is presented. The y axis represents voltage.

The x axis is drawn so that a time of zero corresponds to the VIN signal being received by the motor driver 200. A VDD5_START waveform 800 is shown to quickly increase from 0 Volts to approximately 5 Volts. In this example, the voltage achieved by the VDD5_START waveform 800 is approximately 5.5 Volts.

A VDD5_REG waveform 802 transitions from 0 Volts to approximately 5 Volts at a later time, such as between 100 and 130 μs. A ready waveform 804 transitions from low to high at approximately 150 μs. A VDD5_CHIP waveform 806, indicated by a dashed line, follows the VDD5_START waveform 800 until the ready waveform 804 transitions from low to high. At this point, the VDD5_CHIP waveform 806 follows the VDD5_REG waveform 802.

Figure 9A:
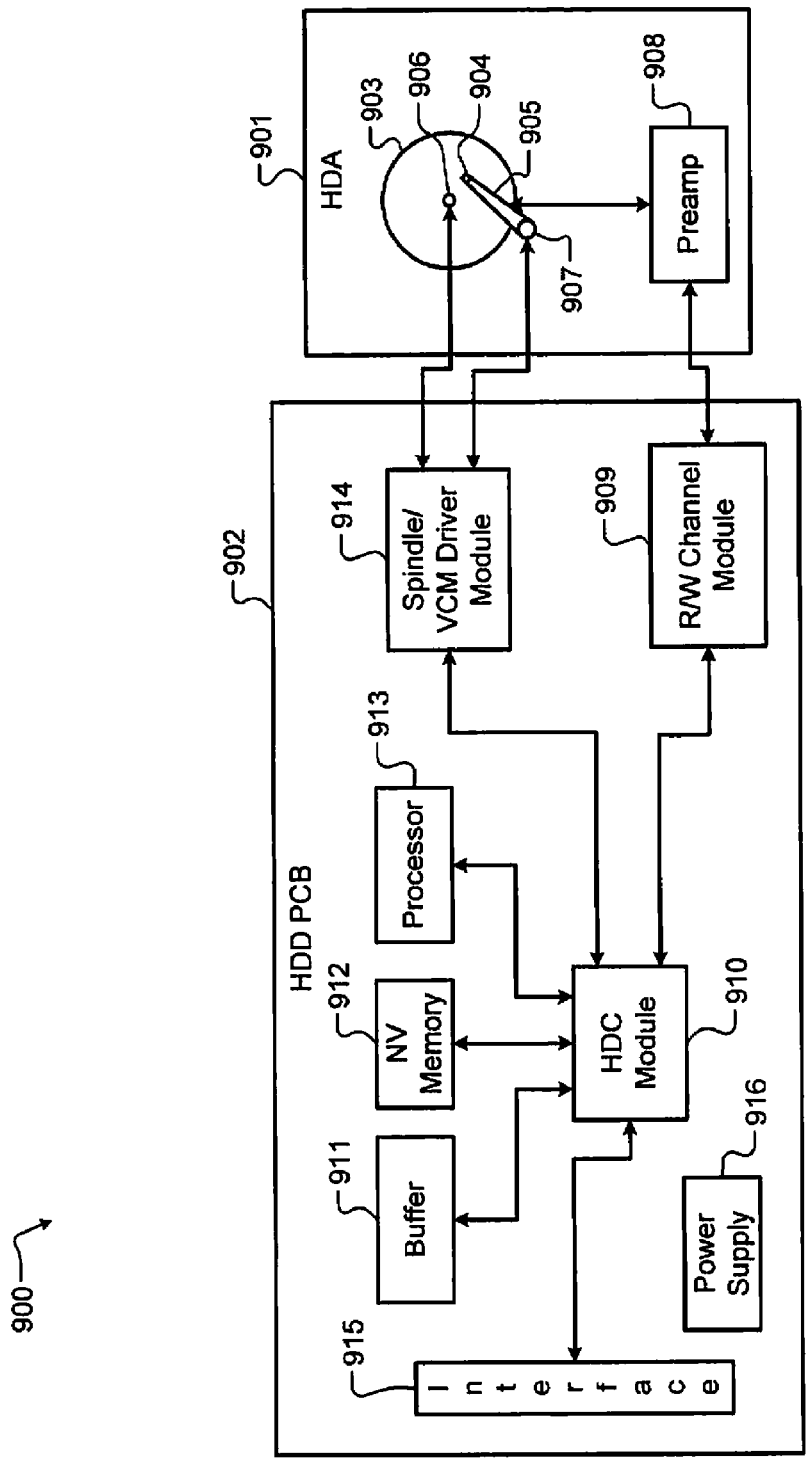
FIG. 9A is a functional block diagram of a hard disk drive.

Referring now to FIGS. 9A-9E, various exemplary implementations incorporating the teachings of the present disclosure are shown. Referring now to FIG. 9A, the teachings of the disclosure can be implemented in a spindle/VCM (voice-coil motor) driver module 914 of a hard disk drive (HDD) 900. The HDD 900 includes a hard disk assembly (HDA) 901 and a HDD PCB 902. The HDA 901 may include a magnetic medium 903, such as one or more platters that store data, and a read/write device 904.

The read/write device 904 may be arranged on an actuator arm 905 and may read and write data on the magnetic medium 903. Additionally, the HDA 901 includes a spindle motor 906 that rotates the magnetic medium 903 and a voice-coil motor (VCM) 907 that actuates the actuator arm 905. A preamplifier device 908 amplifies signals generated by the read/write device 904 during read operations and provides signals to the read/write device 904 during write operations.

The HDD PCB 902 includes a read/write channel module (hereinafter, "read channel") 909, a hard disk controller (HDC) module 910, a buffer 911, nonvolatile memory 912, a processor 913, and the spindle/VCM driver module 914. The read channel 909 processes data received from and transmitted to the preamplifier device 908. The HDC module 910 controls components of the HDA 901 and communicates with an external device (not shown) via an I/O interface 915. The external device may include a computer, a multimedia device, a mobile computing device, etc. The I/O interface 915 may include wireline and/or wireless communication links.

The HDC module 910 may receive data from the HDA 901, the read channel 909, the buffer 911, nonvolatile memory 912, the processor 913, the spindle/VCM driver module 914, and/or the I/O interface 915. The processor 913 may process the data, including encoding, decoding, filtering, and/or formatting. The processed data may be output to the HDA 901, the read channel 909, the buffer 911, nonvolatile memory 912, the processor 913, the spindle/VCM driver module 914, and/or the I/O interface 915.

The HDC module 910 may use the buffer 911 and/or nonvolatile memory 912 to store data related to the control and operation of the HDD 900. The buffer 911 may include DRAM, SDRAM, etc. The nonvolatile memory 912 may include flash memory (including NAND and NOR flash memory), phase change memory, magnetic RAM, or multi-state memory, in which each memory cell has more than two states. The spindle/VCM driver module 914 controls the spindle motor 906 and the VCM 907. The HDD PCB 902 includes a power supply 916 that provides power to the components of the HDD 900.

Figure 9B:
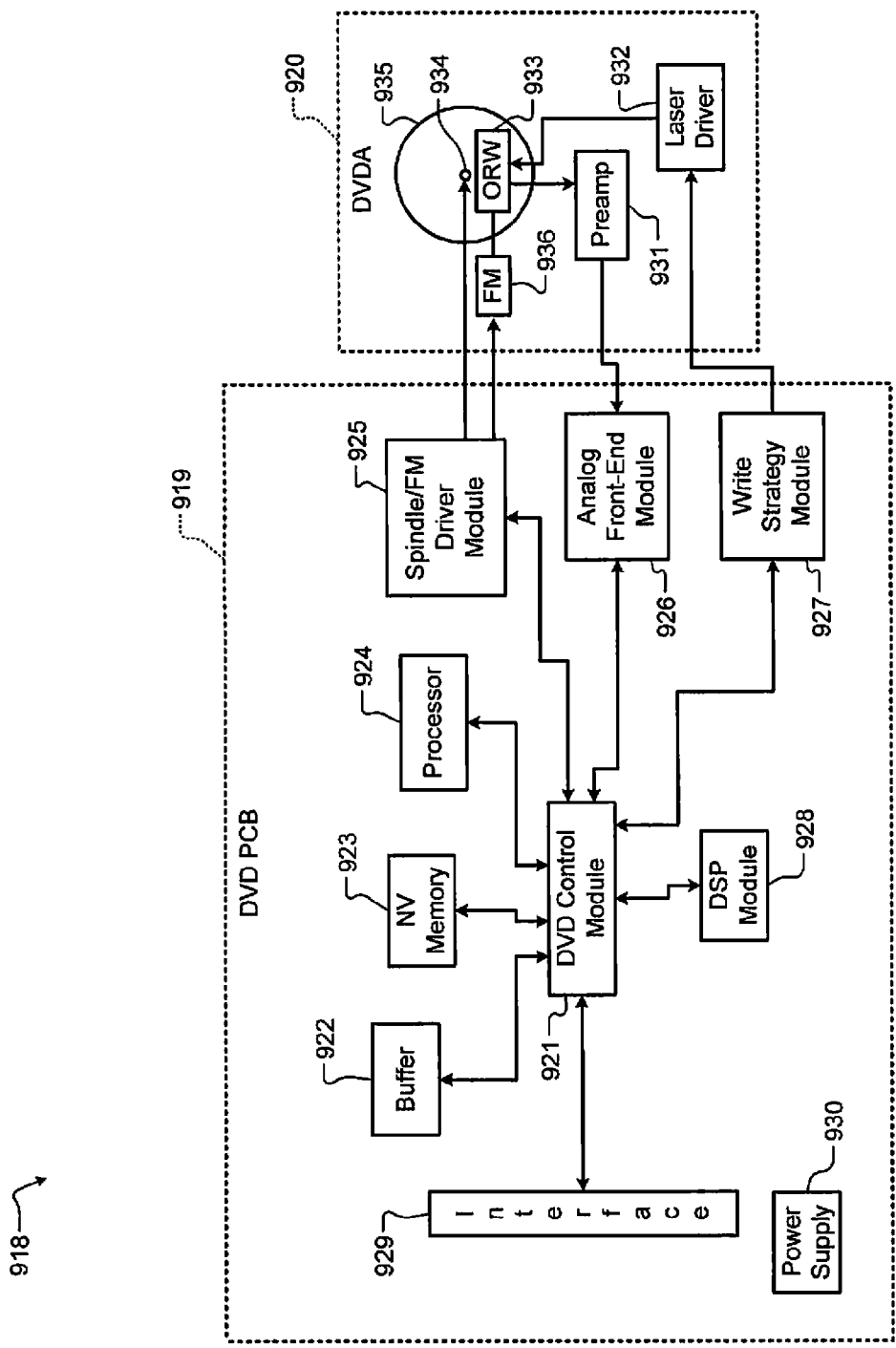
FIG. 9B is a functional block diagram of a DVD drive.

Referring now to FIG. 9B, the teachings of the disclosure can be implemented in a spindle/FM (feed motor) driver module 925 of a DVD drive 918 or of a CD drive (not shown). The DVD drive 918 includes a DVD PCB 919 and a DVD assembly (DVDA) 920. The DVD PCB 919 includes a DVD control module 921, a buffer 922, nonvolatile memory 923, a processor 924, the spindle/FM (feed motor) driver module 925, an analog front-end module 926, a write strategy module 927, and a DSP module 928.

The DVD control module 921 controls components of the DVDA 920 and communicates with an external device (not shown) via an I/O interface 929. The external device may include a computer, a multimedia device, a mobile computing device, etc. The I/O interface 929 may include wireline and/or wireless communication links.

The DVD control module 921 may receive data from the buffer 922, nonvolatile memory 923, the processor 924, the spindle/FM driver module 925, the analog front-end module 926, the write strategy module 927, the DSP module 928, and/or the I/O interface 929. The processor 924 may process the data, including encoding, decoding, filtering, and/or formatting. The DSP module 928 performs signal processing, such as video and/or audio coding/decoding. The processed data may be output to the buffer 922, nonvolatile memory 923, the processor 924, the spindle/FM driver module 925, the analog front-end module 926, the write strategy module 927, the DSP module 928, and/or the I/O interface 929.

The DVD control module 921 may use the buffer 922 and/or nonvolatile memory 923 to store data related to the control and operation of the DVD drive 918. The buffer 922 may include DRAM, SDRAM, etc. The nonvolatile memory 923 may include flash memory (including NAND and NOR flash memory), phase change memory, magnetic RAM, or multi-state memory, in which each memory cell has more than two states. The DVD PCB 919 includes a power supply 930 that provides power to the components of the DVD drive 918.

The DVDA 920 may include a preamplifier device 931, a laser driver 932, and an optical device 933, which may be an optical read/write (ORW) device or an optical read-only (OR) device. A spindle motor 934 rotates an optical storage medium 935, and a feed motor 936 actuates the optical device 933 relative to the optical storage medium 935.

When reading data from the optical storage medium 935, the laser driver provides a read power to the optical device 933. The optical device 933 detects data from the optical storage medium 935, and transmits the data to the preamplifier device 931. The analog front-end module 926 receives data from the preamplifier device 931 and performs such functions as filtering and ND conversion. To write to the optical storage medium 935, the write strategy module 927 transmits power level and timing data to the laser driver 932. The laser driver 932 controls the optical device 933 to write data to the optical storage medium 935.

Figure 9D:
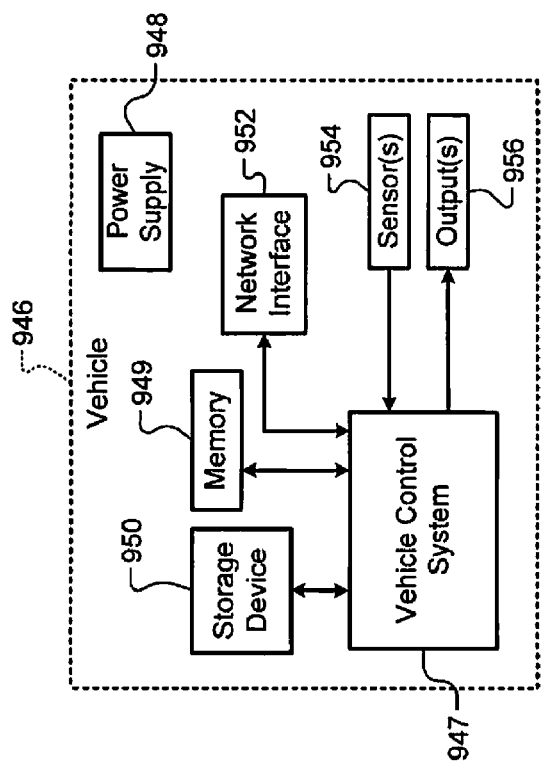
FIG. 9D is a functional block diagram of a vehicle control system.
Figure 9C:
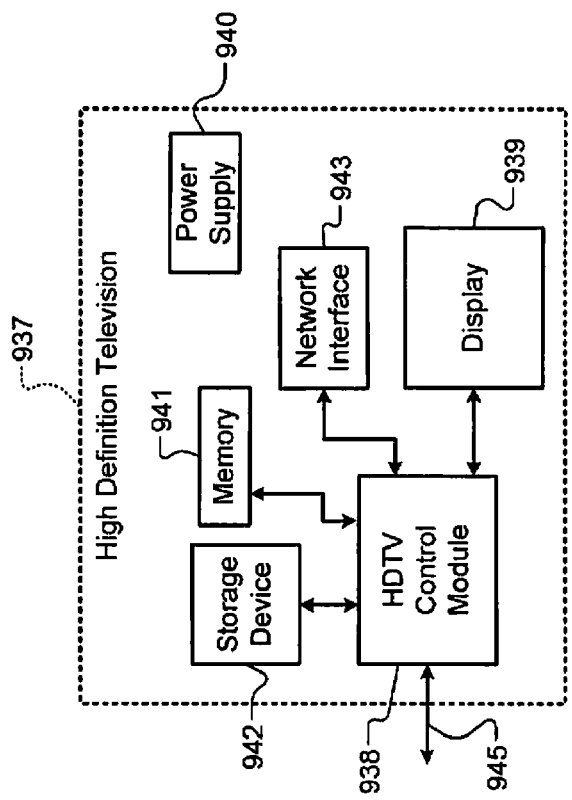
FIG. 9C is a functional block diagram of a high definition television.

Referring now to FIG. 9C, the teachings of the disclosure can be implemented in a storage device 942 of a high definition television (HDTV) 937. The HDTV 937 includes a HDTV control module 938, a display 939, a power supply 940, memory 941, the storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory such as flash memory, phase change memory, or multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Referring now to FIG. 9D, the teachings of the disclosure may be implemented in a storage device 950 of a vehicle 946. The vehicle 946 may include a vehicle control system 947, a power supply 948, memory 949, the storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory such as flash memory, phase change memory, or multi-state memory, in which each memory cell has more than two states. The storage device 950 may include an optical storage drive, such as a DVD drive, and/or a hard disk drive (HDD). The vehicle control system 947 may communicate externally using the network interface 952.

Referring now to FIG. 9E, the teachings of the disclosure can be implemented in a storage device 984 of a set top box 978. The set top box 978 includes a set top control module 980, a display 981, a power supply 982, memory 983, the storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory such as flash memory, phase change memory, or multi-state memory, in which each memory cell has more than two states. The storage device 984 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A power system comprising:
    a first power supply configured to generate a first power signal based on an input power signal, wherein the first power supply is configured to generate the first power signal prior to a second power signal being ready;
    a multiplexer configured to initially output the first power signal and then output the second power signal subsequent to the second power signal being ready; and
    an initialization module configured to be powered by the output of the multiplexer and to establish a bias state of an output power transistor.

2. The power system of claim 1, further comprising the output power transistor, wherein the output power transistor is configured to control a motor.

3. The power system of claim 1, further comprising a second power supply configured to generate the second power signal based on the input power signal.

4. The power system of claim 3, further comprising a third power supply configured to generate a third power signal based on the input power signal, wherein the second power supply is configured to generate the second power signal based on the third power signal.

5. The power system of claim 4, wherein the first power supply comprises:
    a bandgap reference generator configured to generate a reference voltage and a reference current; and
    a voltage generator configured to generate the first power signal based on the reference voltage and the reference current.

6. The power system of claim 5, wherein the first power supply provides the reference voltage to the third power supply.

7. The power system of claim 5, wherein the first power supply includes a power multiplexer configured to output one of the input power signal and the third power signal as a selected power, wherein the bandgap reference generator is configured to generate the reference voltage and the reference current based on the selected power.

8. The power system of claim 4, further comprising a supply analysis module configured to generate a ready signal, wherein the multiplexer is configured to select the second power signal once the ready signal is generated.

9. The power system of claim 8, wherein the supply analysis module is configured to generate the ready signal when, for at least a predetermined period of time, a voltage of the second power signal is greater than a first predetermined voltage and a voltage of the third power signal is greater than a second predetermined voltage.

10. The power system of claim 1, further comprising a supply analysis module configured to generate a ready signal when a voltage of the second power signal is greater than a predetermined voltage for at least a predetermined period of time, wherein the multiplexer is configured to select the second power signal once the ready signal is generated.

11. The power system of claim 1, wherein the multiplexer comprises:
    an inverter that includes an input and an output;
    a first transistor that includes first and second terminals that communicate with the output of the multiplexer and with the first power signal, respectively, wherein a control terminal of the first transistor communicates with one of the input and the output of the inverter; and a second transistor that includes first and second terminals that communicate with the output of the multiplexer and with the second power signal, respectively, wherein a control terminal of the second transistor communicates with an other one of the input and the output of the inverter.

12. The power system of claim 11, wherein the multiplexer further comprises:
   a third transistor that includes a first terminal that communicates with the input of the inverter and a control terminal that receives a ready signal;
   a first current mirror configured to provide a first current proportional to a reference current received from the first power supply; and
   a second current mirror configured to provide a second current proportional to the first current, wherein the third transistor is biased by the second current.

13. A method comprising:
   generating a first power signal based on an input power signal, the first power signal being generated prior to a second power signal being ready;
   operating a switch to initially connect the first power signal to a node and then to connect the second power signal to the node; and
   using power from the node, establishing a bias state of an output power transistor.

14. The method of claim 13, further comprising controlling a motor using the output power transistor.

15. The method of claim 13, further comprising generating a third power signal based on the input power signal, wherein the second power signal is generated based on the third power signal.

16. The method of claim 15, further comprising:
   generating a bandgap reference voltage and a reference current; and
   generating the first power signal based on the reference voltage and the reference current.

17. The method of claim 16, further comprising generating the third power signal based on the bandgap reference voltage.

18. The method of claim 16, further comprising:
   selecting one of the input power signal and the third power signal as a selected power; and
   generating the bandgap reference voltage and the reference current based on the selected power.

19. The method of claim 15, further comprising:
   selectively generating a ready signal; and
   connecting the second power signal to the node once the ready signal is generated.

20. The method of claim 19, further comprising generating the ready signal when, for at least a predetermined period of time, a voltage of the second power signal is greater than a first predetermined voltage and a voltage of the third power signal is greater than a second predetermined voltage.

* * * * *